United States Patent [19]

Kodama et al.

[11] Patent Number: 5,276,807
[45] Date of Patent: Jan. 4, 1994

[54] BUS INTERFACE SYNCHRONIZATION CIRCUITRY FOR REDUCING TIME BETWEEN SUCCESSIVE DATA TRANSMISSION IN A SYSTEM USING AN ASYNCHRONOUS HANDSHAKING

[75] Inventors: Jean Kodama, Cerritos; Borden T. Moller, Irvine; Paul R. Nitza, Tustin, all of Calif.

[73] Assignee: Emulex Corporation, Costa Mesa, Calif.

[21] Appl. No.: 556,878

[22] Filed: Jul. 20, 1990

Related U.S. Application Data

[63] Continuation of Ser. No. 37,739, Apr. 13, 1987, abandoned.

[51] Int. Cl.⁵ .............................................. G06F 13/42
[52] U.S. Cl. .................................. 395/200; 395/550; 364/240; 364/240.1; 364/240.8; 364/240.9; 364/270.5; 364/DIG. 1; 370/91; 370/100.1
[58] Field of Search ............... 395/500, 550, 725, 200; 370/91, 100.1

[56] References Cited

U.S. PATENT DOCUMENTS

| | | | |
|---|---|---|---|
| 4,390,969 | 6/1983 | Hayes | 395/550 |
| 4,587,609 | 5/1986 | Boudreau et al. | 395/725 |
| 4,807,116 | 2/1989 | Katzman et al. | 395/200 |
| 5,014,186 | 5/1991 | Chisholm | 395/275 |
| 5,133,062 | 7/1992 | Joshi et al. | 395/500 |

Primary Examiner—Thomas C. Lee
Assistant Examiner—Maria N. Von Buhr
Attorney, Agent, or Firm—Spensley Horn Jubas & Lubitz

[57] ABSTRACT

Bus interfacing circuitry provides for high speed communication of signals on a bus by using circuitry that synchronizes data transfers to a single reference point, executes commands from a dual-ranked buffer in order to reduce time consumed by external interrupts, and stores multiple bytes in a FIFO buffer to allow rapid sequential transfers; while also providing a flexible input/output configuration allowing both single-ended and differential mode connections.

36 Claims, 11 Drawing Sheets

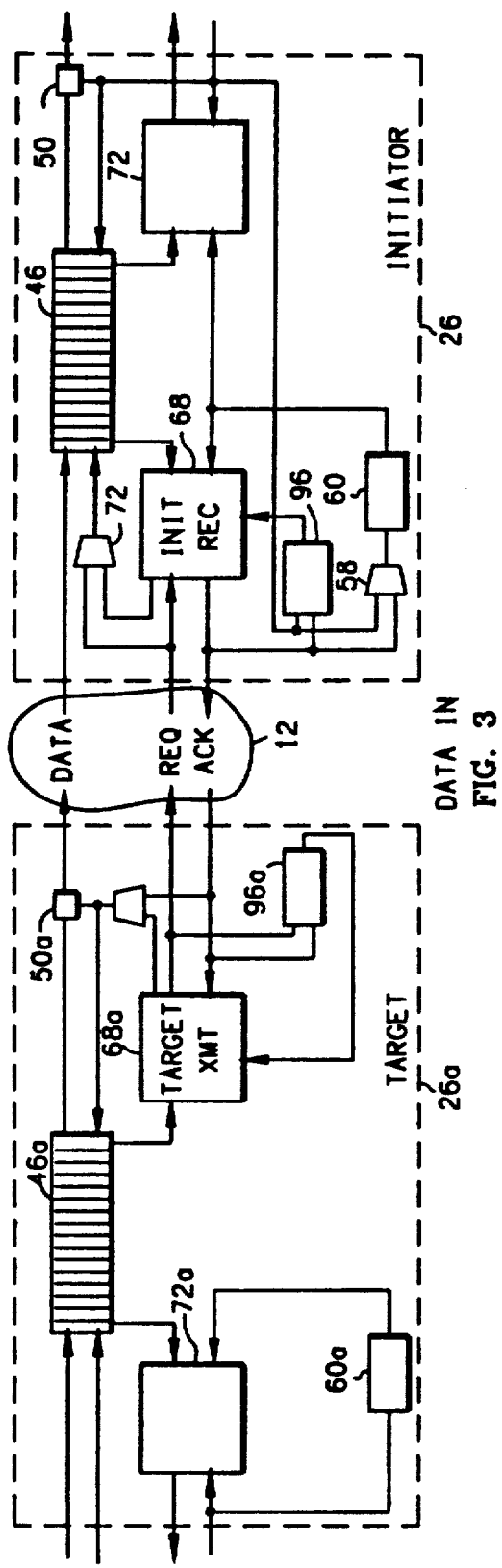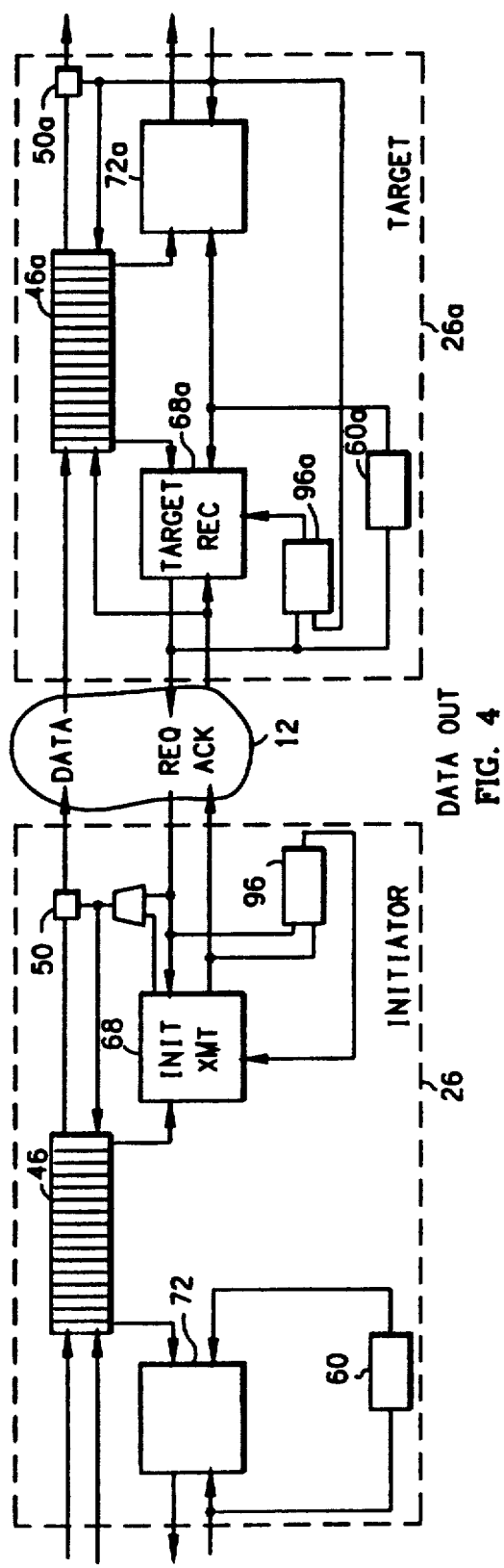

BUS INTERFACE SYNCHRONIZATION CIRCUITRY FOR REDUCING TIME BETWEEN SUCCESSIVE DATA TRANSMISSION IN A SYSTEM USING AN ASYNCHRONOUS HANDSHAKING

This is a continuation of copending application Ser. No. 07/037,739 filed on Apr. 13, 1987, now abandoned.

FIELD OF THE INVENTION

This invention is generally related to the field of electronic computer systems, and more particularly pertains to circuitry for transferring information to and from computer communications buses.

BACKGROUND OF THE INVENTION

Modern computer systems have evolved so that different circuitry components may be connected to a common bus which allows information to be passed back and forth as electrical signals between the components. The design of the bus, and the format and meaning assigned to bus signals is set by a bus protocol, which may be formalized as an industry standard adopted by manufacturers. One such industry standard protocol is the Small Computer System Interface (SCSI) protocol that provides for a nine bit parallel bus which includes one parity bit, and nine control lines, which combined are referred to as a "SCSI bus" and which has a total of eighteen lines. That standard is a draft standard proposed by the ANSI X3T9.2 task group.

A known method of connecting to a SCSI bus is to connect a microprocessor to SCSI interfacing circuitry, which typically consists of discrete devices, external drivers, and a SCSI interface integrated circuit chip. Typically, the microprocessor performs various functions to control the interfacing circuitry in accordance with the SCSI protocol.

A problem encountered with prior SCSI interfacing circuitry is the limited rate at which large amounts of data may be transferred from point to point through a SCSI bus.

Another problem encountered with prior SCSI interfacing circuitry is the large amount of time and instruction storage required by the microprocessor to perform various SCSI protocol functions in controlling the SCSI interfacing circuitry.

OBJECTS OF THE INVENTION

It is therefore an object of this invention to provide bus interfacing circuitry having a bus protocol processor for use in high performance SCSI interfacing circuitry.

Another object of the invention is to provide bus interfacing circuitry adapted to provide an increased rate of data transfer on a bus.

A further object of this invention is to provide bus interfacing circuitry which performs complicated bus protocol operations and sequences without requiring intervention by an external microprocessor, thus avoiding time delays and program storage requirements associated with such intervention.

SUMMARY OF THE INVENTION

The bus interfacing circuitry of this invention has a bus protocol processor which performs sequences of operations. When used for asynchronous communications on the bus, synchronization is achieved using only one synchronization point, thus saving synchronization time, and a delay line storage technique is used for asynchronous parity checking. The bus control processor also incorporates a FIFO buffer which is large enough to store multi-byte bus protocol sequences and thus allows bus transfers without external microprocessor intervention. The bus control processor has a ranked command buffer capable of executing commands in a sequence, including commands requiring interrupts of an external processor, and has latched buffer circuitry for storing the contents of condition registers after such interrupts. The processor further includes output pin function selection circuitry allowing processor chip output pins to function either as single-ended or differential circuit controlling outputs.

DESCRIPTION OF THE DRAWINGS

FIGS. 3 and 4 show electrical block diagrams of a pair of interfaces each including the bus interfacing circuitry of this invention, and connected together by a SCSI bus; with FIG. 3 showing a "DATA-IN" configuration and FIG. 4 showing a "DATA-OUT" configuration;

DESCRIPTION OF THE PREFERRED EMBODIMENT

Figure 1:
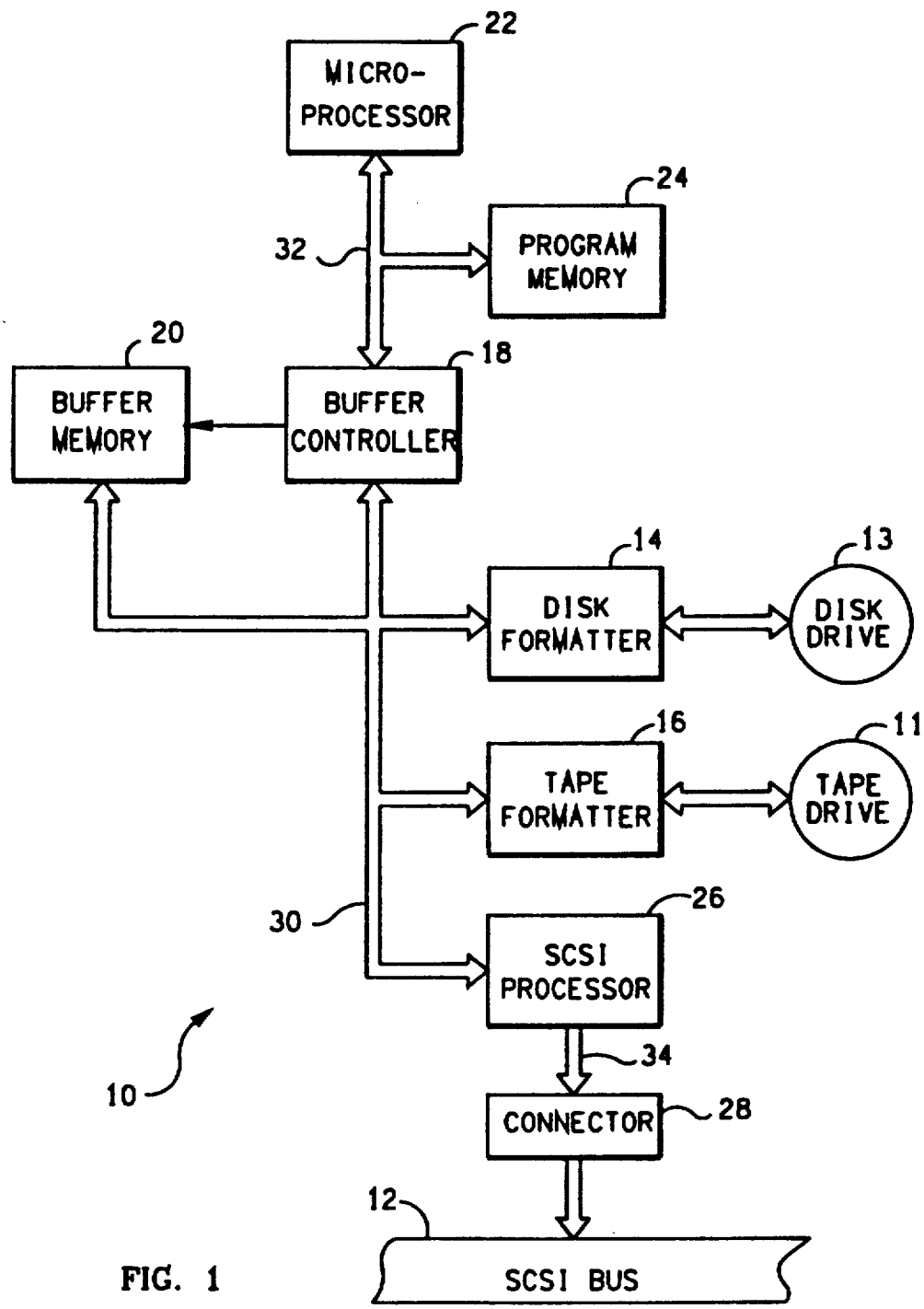
FIG. 1 is an electrical block diagram of a computer disk and tape controller which includes the bus interfacing circuitry of this invention.

Referring first to FIG. 1, a disk and tape controller 10 is a programmed electronic controller for connecting a computer tape drive 11 and disk drive 13 to the SCSI bus 12. The SCSI bus 12 is an electrical cable with at least eighteen conductors which is used for connecting a plurality of electronic devices together in parallel to the bus 12. For example, a central computer (not shown) may be connected to the bus 12 in order to exchange electrical data bit signals with the disk and tape controller 10.

The controller 10 includes a disk formatter 14, a tape formatter 16, a buffer controller 18, buffer memory (DRAMs) 20, an external microprocessor 22, and a program memory (EPROM) 24, each of which are known, conventional electronic devices. The EPROM 24 is programmed with instructions specifically tailored to the type of disk drive and tape drive to be controlled, and the desired operation of the controller 10. The microprocessor 22 uses instructions from the EPROM 24 to control the operation of the controller 10. The controller 10 also includes a SCSI processor 26 and connector 28 which electrically interface the controller 10 to the bus 12 in accordance with the standard SCSI protocol. The controller 10 is representative of the types of devices which may be connected to the bus 12; and the SCSI processor 26 and connector 28 may be used to connect other types of devices, such as computers or other data storage devices, to the bus 12.

The SCSI processor 26 has a processor bus 30 which has eight parallel lines which carry data bit signals to and from the SCSI processor 26 inside the controller 10. Digital data received on the bus 12 for storage on the tape drive 11 or disk drive 13 passes through the SCSI processor 26 and is placed on the bus 30 for transfer to the formatter 16 and DRAMs 20. Similarly, digital data for transmission on the bus 12 from the tape drive 11 or disk drive 13 passes from the bus 30 to the SCSI processor 26. The buffer controller 18 also has a control connection 32 through which the microprocessor 22 exchanges signals with the buffer controller 18 for controlling the operation of processor 26 and monitoring its operation through the processor bus 30.

The SCSI processor 26 has a SCSI connection 34 which carries electrical signals between the processor 26 and the connector 28 for communication with the SCSI bus 12. The connector 28 is preferably a known, conventional electronic circuit for connecting to the SCSI bus 12 and may contain line drivers or transceivers of the single-ended or differential type.

Because the SCSI bus 12 is often used as the interconnection for communications between two or more electronic devices, and the same conductors are used for transferring signals to and from each device, it is important that the time between sequential signals be kept as short as possible. The proportion of time that signals are on the bus 12 in comparison to the total time is referred to as the bus "utilization". It is important that the bus utilization be high in order to allow for transfers of large amounts of data in the shortest possible time. The SCSI processor 26 operates to improve the utilization of the bus 12 by assuring that signals are placed on the bus as promptly as possible, and unnecessary delays are avoided. In particular, under asynchronous operations provided for by the SCSI protocol, the SCSI processor 26 operates to assure that signal bytes are transferred through the bus 12 with minimum delays for synchronization and minimum times between sequential bytes.

Figure 2:
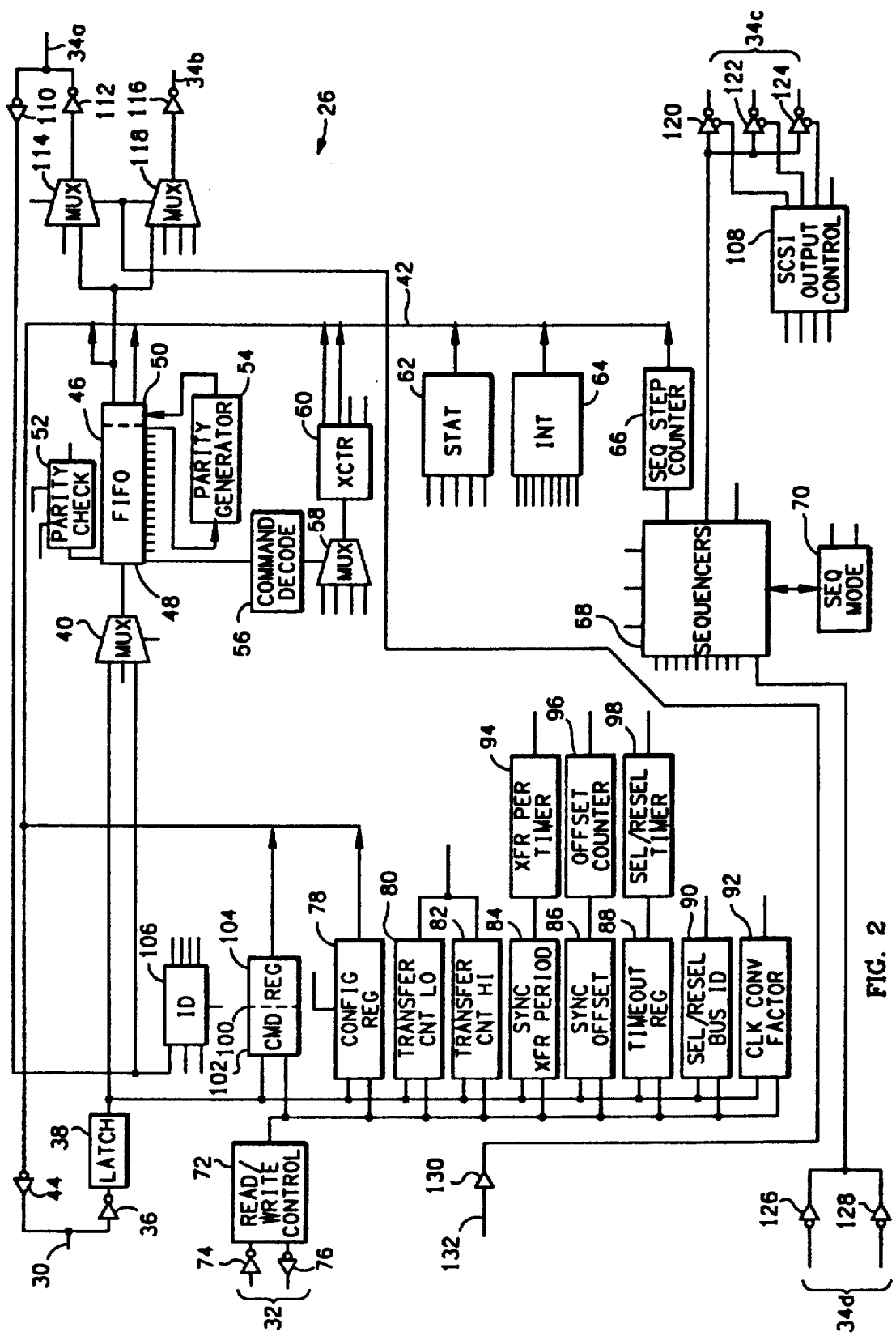
FIG. 2 is an electrical block diagram of the bus protocol processor used in the bus interfacing circuitry of this invention.

Referring next to FIG. 2, the SCSI processor 26 is preferably constructed as a single digital integrated circuit chip, and is preferably made as an interconnection of gates with a plurality of pin-outs for connection to external circuitry. The processor 26 has a connection to the processor bus 30 through a driver 36 and latch 38 to an input of a FIFO input multiplexer 40. The processor 26 also has a transfer bus 42 which connects to the processor bus 30 through a driver 44. The processor 26 has a first-in first-out (FIFO) buffer 46 with one end 48 connected to the output of multiplexer 40 and the other end 50 connected to the bus 42. The FIFO 46 is preferably eight bits wide and 16 locations deep; thus having a storage capacity of 16 bytes with eight data bits per byte stored. A parity check circuit 52 is connected to the end 48 of the FIFO 46. The end 50 of the FIFO 46 is a latched register which is coupled to receive and provide signals to the bus 42. A parity generator circuit 54 has its input coupled to a location inside FIFO 46 adjacent the latched end 50, and its output coupled to the latched end 50.

Processor 26 has a command decoder 56 having an input coupled to the end 48 of FIFO 46, and an output which controls the transfer counter input multiplexer 58. The multiplexer 58 has its output connected to the transfer counter 60 which has its output connected to the bus 42.

The processor 26 also has a status register 62 and interrupt status register 64 coupled to the bus 42. A sequence step register 66 has its output coupled to the bus 42 and its input coupled to sequencers 68. The sequencer mode register 70 is connected to sequencers 68.

The processor 26 has a read/write control module 72 which is connected through drivers 74 and 76 to the control connection 32. The control 72 is coupled to a configuration register 78, a transfer count low register 80, a transfer count high register 82, a synchronous transfer period register 84, a synchronous offset register 86, a select/reselect timeout register 88, a select/reselect bus ID register 90, and a clock conversion factor register 92. A synchronous transfer period timer 94 is connected to register 84, a synchronous offset counter 96 is connected to the register 86, and a select/reselect timer 98 is connected to the register 88.

The processor 26 has a double-ranked command register 100 which is used to give commands to the SCSI processor 26. The register 100 has a top rank 102 and a bottom rank 104. The top rank 102 is coupled to the latch 38 and the read/write control 72. The bottom rank 104 is coupled to the transfer bus 42.

The SCSI processor 26 also has an ID module 106 and a SCSI output control 108. The SCSI connection 34 is shown as four groups of conductors: a data in bus 34a, a data out bus 34b, control line outputs 34c, and control line inputs 34d. Driver 110 connects the bus 34a to inputs of the multiplexer 40 and ID module 106. Driver 112 connects the bus 34a to the output of multiplexer 114 which has an input connected to the end of 50 of FIFO 46. Driver 116 connects the bus 34b to the output of multiplexer 118 which has an input connected to the end 50 of FIFO 46. Drivers 120, 122 and 124 couple outputs 34c to outputs of sequencers 68 and are controlled by control 108. Receivers 126 and 128 couple inputs 34d to sequencers 68. Receiver 130 has its input connected to differential mode enable pin 132.

The FIFO buffer 46 is loaded at its top end 48 and unloaded at its bottom end 50. The FIFO 46 may contain up to sixteen bytes of information received from or for transfer to the SCSI bus 12. The FIFO 46 is deep enough so that the multi-byte command sequences defined by the standard SCSI protocol may be accommodated inside the FIFO 46 without requiring multiple interrupts or interventions by the microprocessor 22. This ability to avoid creating interrupts saves much time on the SCSI bus, and increases its utilization, by avoiding delays due to time consuming operations by the relatively low speed microprocessor 22.

The dual-ranked command register 100 is arranged so that the microprocessor 22 may stack commands in the SCSI processor 26. The top rank 102 may be loaded through the latch 38 under the supervision of control 72. Commands may be placed in both the top rank 102 and the bottom rank 104. After the command in the bottom rank 104 has been completed and reported, the command (if present) in the top rank 102 will automatically fall to the bottom rank 104 and execute. When no command is executing in the bottom rank 104, the command register 100 is empty and the bottom rank 104 contains the last command executed. Many commands executed from the command register 100 cause interrupts of the microprocessor 72 through the read/write control 72. When such an interrupt producing command is executed in the bottom rank 104, the processor 26 automatically causes the contents of the status register 62, interrupt status register 64, and sequence step counter 66 to be transferred to latches in those same registers. While the interrupt of processor 22 is pending, the command in the top rank 102 automatically drops into the bottom rank 104 and executes, and uses working (non-latched) portions of the registers 62, 64 and 66. Upon return from the interrupt, the microprocessor 22 may use the latched contents of the registers 62, 64 and 66 for further directing the operation of the SCSI processor 26. The operational speed of the processor 26, and the utilization of the SCSI bus 12, is improved by the use of the double-ranked command buffer 100 which allows the processor 26 to execute the next instruction from the top rank 102 while the microprocessor 22 is responding to an interrupt produced by the command immediately previously executed from the bottom rank 104. This use of command register 100 with dual ranks allows the SCSI processor 26 and microprocessor 22 to operate simultaneously, with the microprocessor 22 responding to interrupts from the SCSI processor 26.

The differential mode enable pin 132 alters the data paths through the multiplexers 114 and 118. When the pin 132 is grounded, the bus 34a is used for input signals from the SCSI bus 12 and bus 34b is used for output signals to the SCSI bus 12. The buses 34a and 34b may be connected together to make a bi-directional single-ended connection to the SCSI bus 12. Alternatively, the buses 34a and 34b may be connected to external driver and receiver circuits inside the connector 28 which are connected together to make a bi-directional single-ended connection to the SCSI bus 12.

If the pin 132 is connected to a high electrical level (above ground), the multiplexers 114 and 118 are controlled such that the bus 34a acts as a bi-directional single-ended bus for the data bit signals with inputs through receiver 110 and outputs through driver 112, and bus 34b acts as a set of control lines for controlling the operation of bi-directional differential transceivers in the connector 28.

Referring next to FIG. 3, simplified block diagrams are shown for a Initiator processor 26 and Target processor 26a, both of which are simplified from, and are identical in construction to the SCSI processor 26 of FIGS. 1 and 2. The terms "Initiator" and "Target" are standard terms in the SCSI protocol, and refer to operating modes for devices connected to the SCSI bus 12. The processors 26 and 26a are shown operating in a "DATA IN" mode, another standard SCSI protocol term, which refers to the condition when the Target processor 26a is sending bytes of data bit signals to the Initiator processor 26. The labeling of reference numbers with a letter a in FIGS. 3 and 4 indicates the particular SCSI processor 26 which is operating as a Target.

Referring next to FIG. 4, the same pair of SCSI processors, Initiator 26 and Target 26a, as in FIG. 3 are shown, but in a "DATA-OUT" mode in which bytes of data bit signals are being sent from the Initiator 26 to the Target 26a.

Figure 5A:
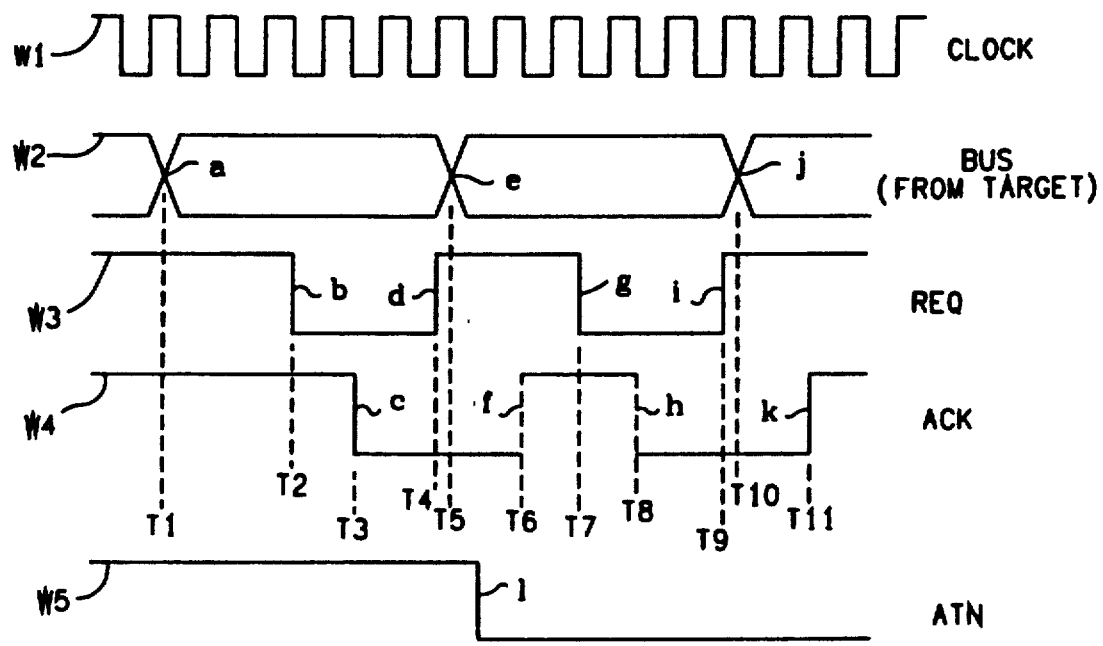
FIGS. 5(a) and 5(b) show electrical timing waveforms for asynchronous transfers during "DATA-IN" and "DATA-OUT" configurations.

Referring next to FIG. 5a, waveforms for the DATA IN mode as presented in FIG. 3 are shown. The CLOCK waveform W1 is for the clock inside the SCSI processor 26a, and is preferably approximately 24 MHz. The BUS waveform W2 represents signals on the nine bit parallel bus lines of the SCSI bus 12, with the X-shaped markings indicating the times when signal level changes are occurring. The REQ waveform W3 represents the request SCSI protocol signal sent on the SCSI bus 12 by the Target processor 26a. The ACK waveform W4 represents the acknowledgement SCSI protocol signal sent on the SCSI bus 12 by the Initiator processor 26. The ATN waveform W5 represents the attention SCSI protocol signal sent on the SCSI bus 12 by the Initiator processor 26.

The transfer of signals during the DATA IN mode proceeds as follows.

The SCSI processor 26a which is configured as the Target places signals on the SCSI bus 12 at the time T1, as shown in point a on waveform W2. The point a shown on waveform W2 is used as the synchronization point for the SCSI processor 26a, and this point a is keyed by the processor 26a to start usage of the clock waveform W1 to control the internal operations of the processor 26a. The point a initiates the sequencing of commands through the processor 26a. Once synchronization with the point a has occurred, the processor 26a pulls down the REQ waveform W3 at a point b and time T2 as a signal to the Initiator SCSI processor 26 that the data bit signals in BUS waveform W2 are valid, stable and ready to be read from the SCSI bus 12. The Target processor 26a sets the time duration between times T1 and T2 to be at least the amount required by the SCSI protocol, which in the processor 26a is at least two cycles of the CLOCK waveform W1.

The Initiator processor 26 responds to the reception of point b on waveform W3 by reading data bit signals from the bus waveform W2 and by pulling down the ACK waveform W4 at point c ant time T3. Note that the production of the point c at time T3 is asynchronous, and results from the time when the Initiator processor 26 receives point b on waveform W3 and the time when the Initiator processor 26 is able to receive the data bit signals from the SCSI bus 12 as in waveform W2.

Next, the Target processor 26a pulls up the waveform W3 at the point d and time T4. When data bit signals are available for the Target processor 26a to transmit, it places the next sequential data bit signals on the parallel bus waveform W2 at the point e and time T5. The action at T5 is asynchronous, and results from the receipt of the point c on waveform W4 by the Target processor 26a and the availability of data bit signals to be transmitted. After the Initiator processor 26 reads the data bit signals from the SCSI bus 12, waveform W2, at time T3, the processor 26 begins checking the parity of the received data. The parity check circuit 52 requires a predetermined amount of time to perform its operation and produce a parity check indication output for each received byte of data from the SCSI input lines 34a. To avoid requiring another clock synchronization, Initiator processor 26 incorporates an internal delay circuit in the end 48 of FIFO 46, so that data signals are loaded into FIFO 46 after the parity check circuit 52 has completed its work. If Initiator processor 26 determines that the parity of the data bits received was not correct, as determined by parity check circuitry 52, the attention ATN waveform W5 is pulled down at point l, which indicates back to the Target processor 26a that a parity error was detected. After another internal time delay long enough to assure that ATN waveform W5 is stable after the point l, Initiator processor 26 pulls up the waveform W4 at the point f and time T6 provided that the Target processor 26a pulls up the REQ waveform W3 at T4 prior to T6. If the parity check circuit 52 determines that the parity of the data bit signals received by the Initiator processor 26 is correct, then no change in the ATN waveform W5 is made at point l. The Target processor 26a resynchronizes itself at the point e and time T5 so that all internal operations are keyed to start the usage of CLOCK waveform W1 at the time T5. The point e initiates the sequencing of commands through the processor 26a. Synchronization of the processor 26a at a single point (in this case, point e) during the transfer of a single asynchronous byte on the SCSI bus 12 insures that the time which would be required for more than one synchronization is saved, and the maximum utilization of the SCSI bus 12 is achieved.

The Target processor 26a will pull down the REQ waveform W3 at the point g and time T7 provided that the Initiator processor pulls up the ACK waveform W4 at the point f and time T6 prior to time T7. The production of the point f at time T7 is asynchronous, and results from the time when the Initiator processor 26 receives point d on waveform W3. The points b, c, d and f on waveforms W3 and W4 complete the asynchronous handshake between the Target processor 26 and Initiator processor 26a.

Figure 5B:
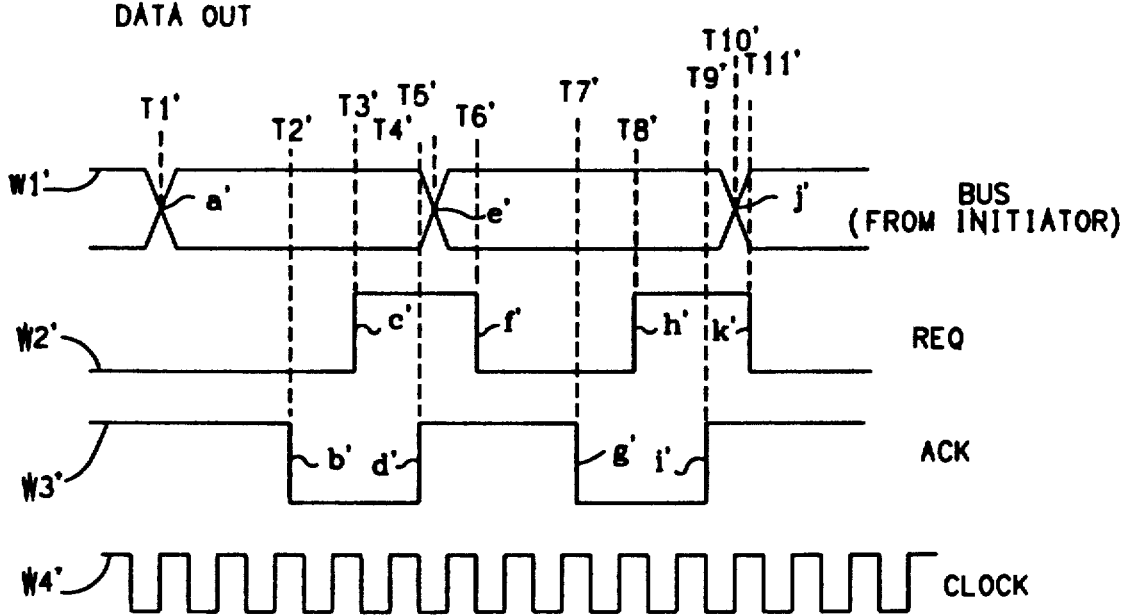

Referring next to FIG. 5b, the timing relations for the DATA-OUT mode are shown for the Initiator processor 26 and Target processor 26a, with the analogous timing and waveform points labeled similarly to those in FIG. 5a but with a prime superscript to distinguish them from the DATA IN situation shown in FIG. 5a.

Figure 6:
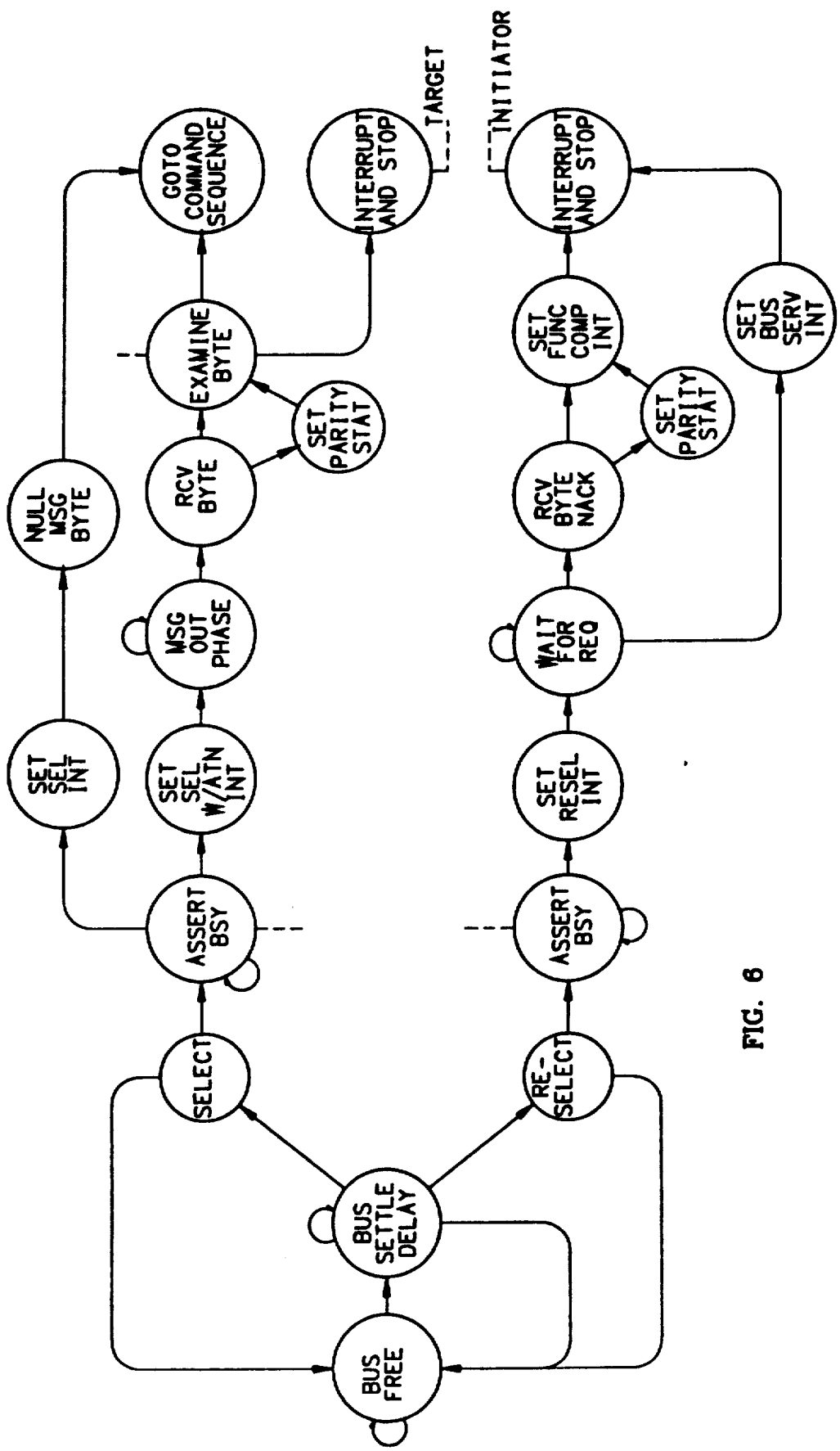
FIGS. 6 through 15 are state diagrams illustrating the sequence of states for the bus protocol processor used in the bus interfacing circuitry of this invention.
Figures 7, 8:
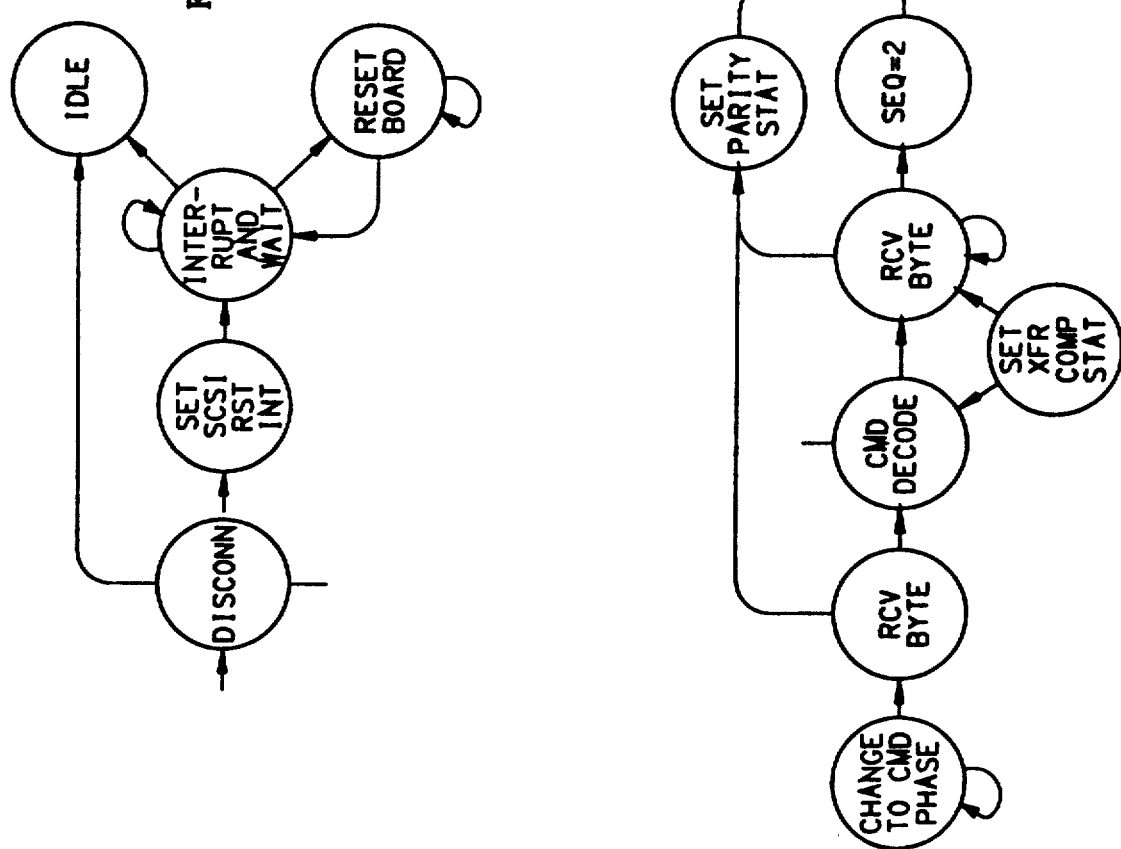

Referring next to FIGS. 6 and 7, bus initiated sequences are shown for the internal operations of the SCSI processor 26 under the control of sequencers 68 due to the presence of signals, such as REQ, BSY, ACK, ATN, SEL, MSG, CD, or IO, on control line inputs 34d. The labeling of the sequencer states in FIGS. 6 through 15 is in accordance with the structure of SCSI processor 26, as previously described, and the standard SCSI protocol.

Figure 9:
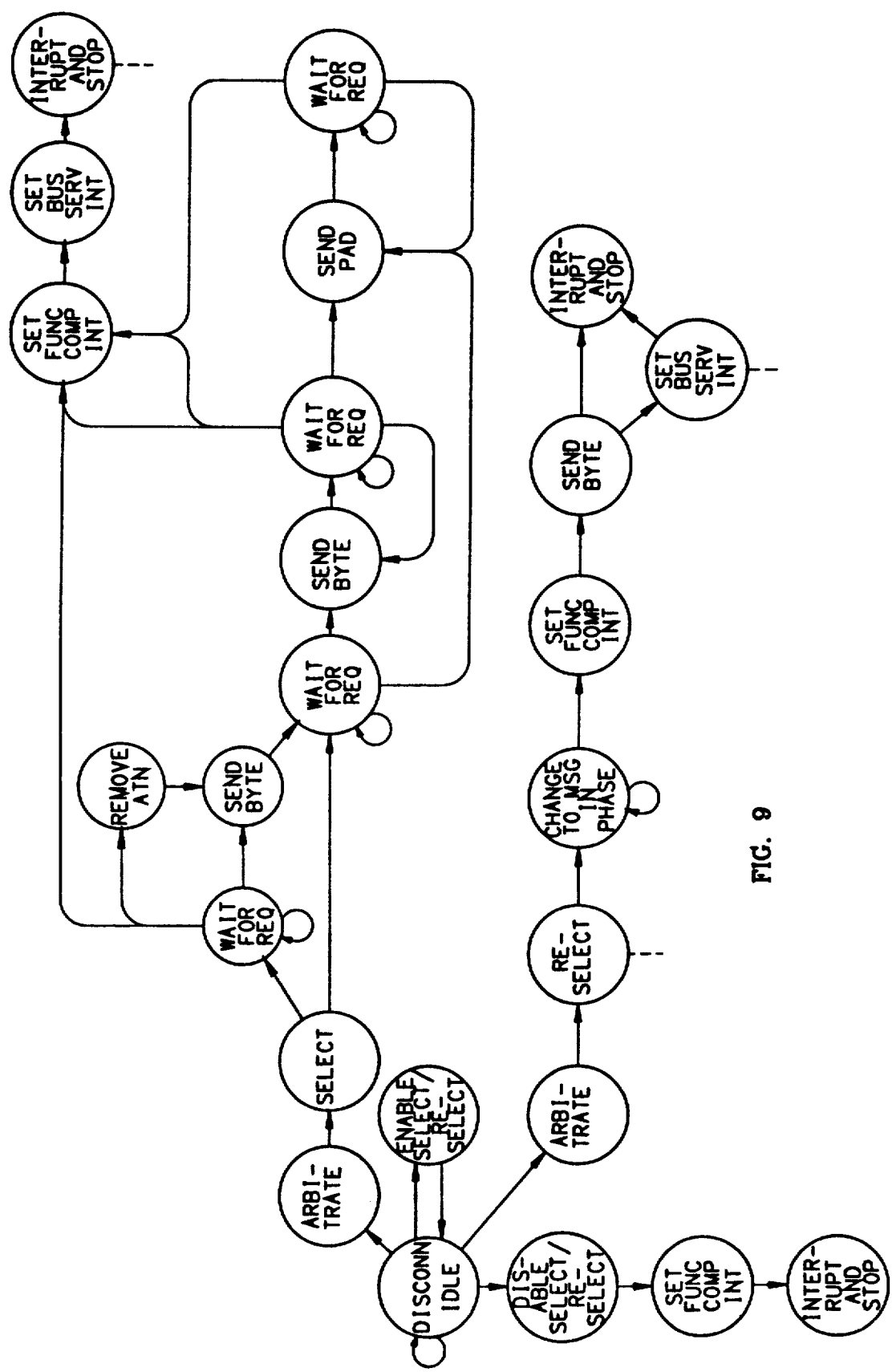
Figure 10:
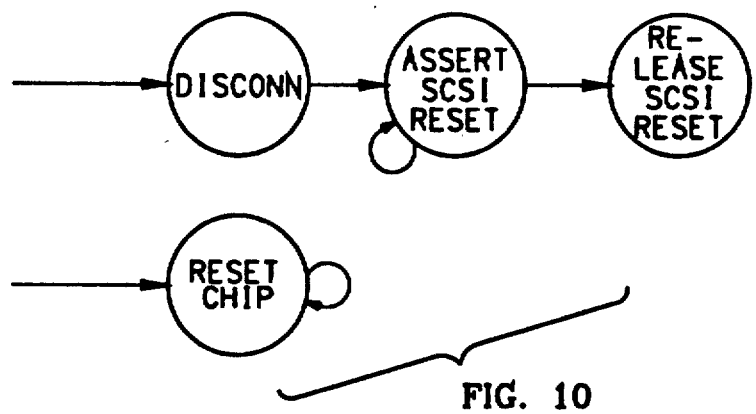
Figure 11:
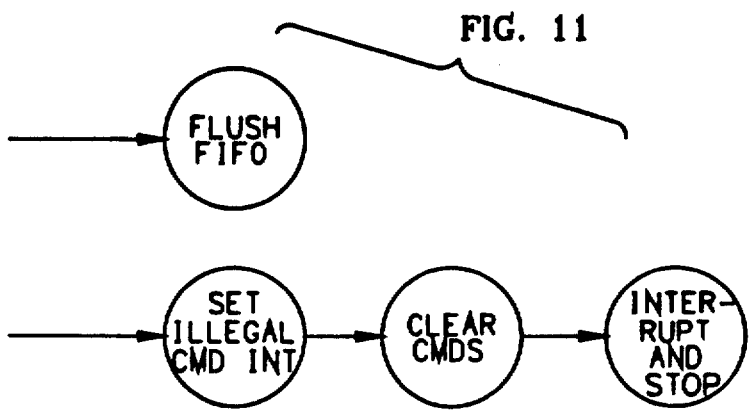
Figure 12:
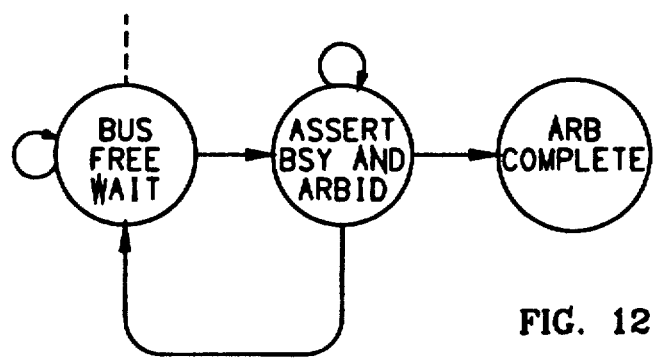
Figure 13:
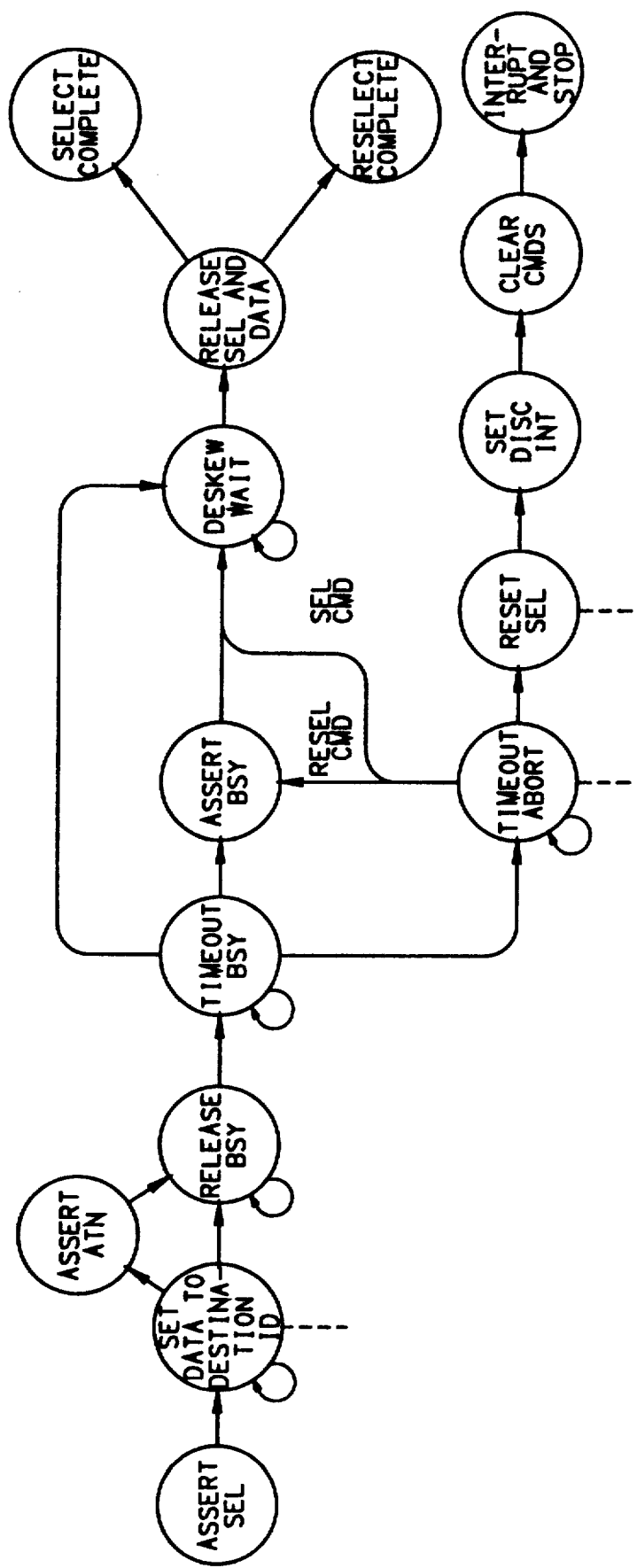
Figure 14:
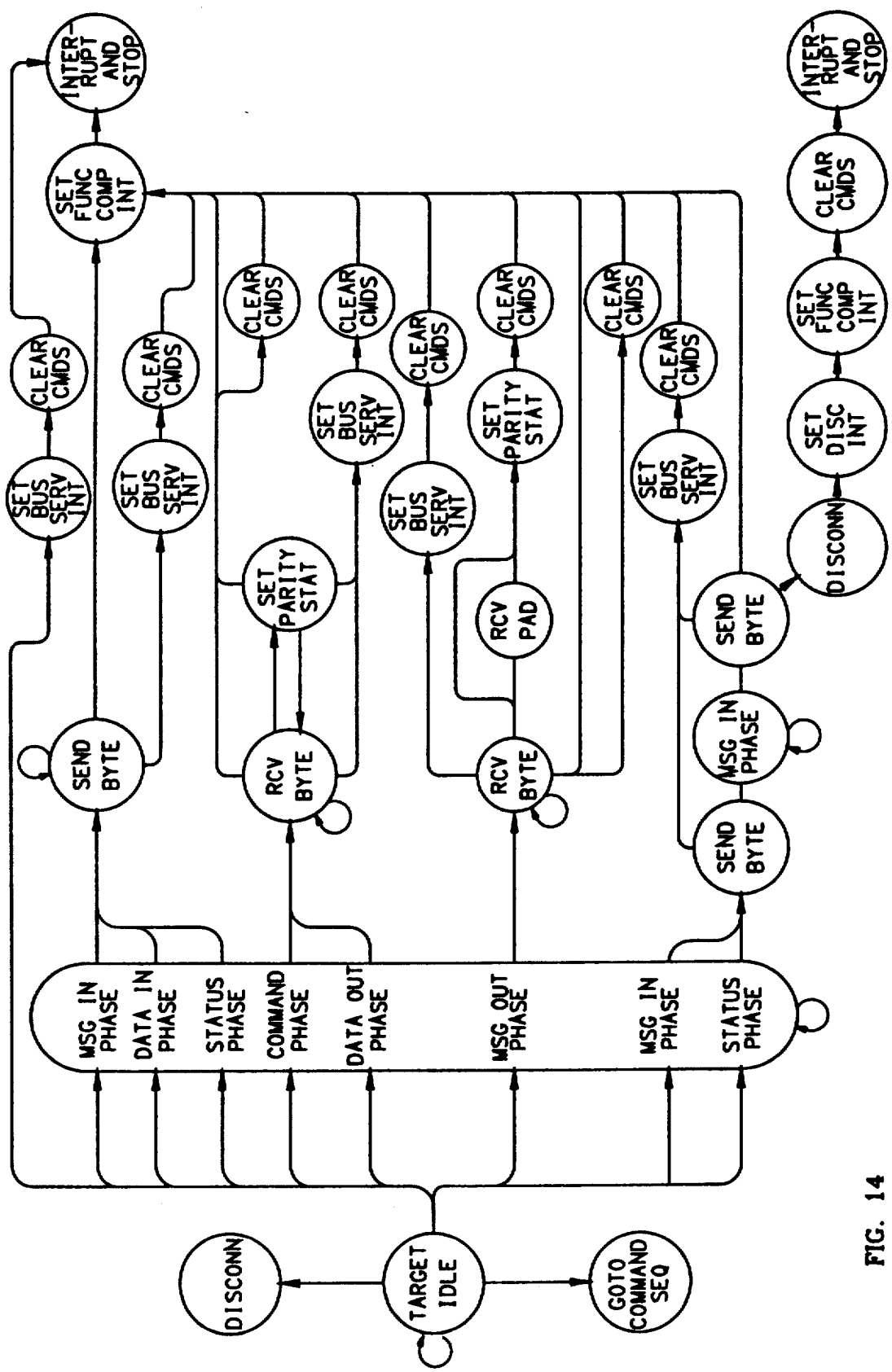
Figure 15:
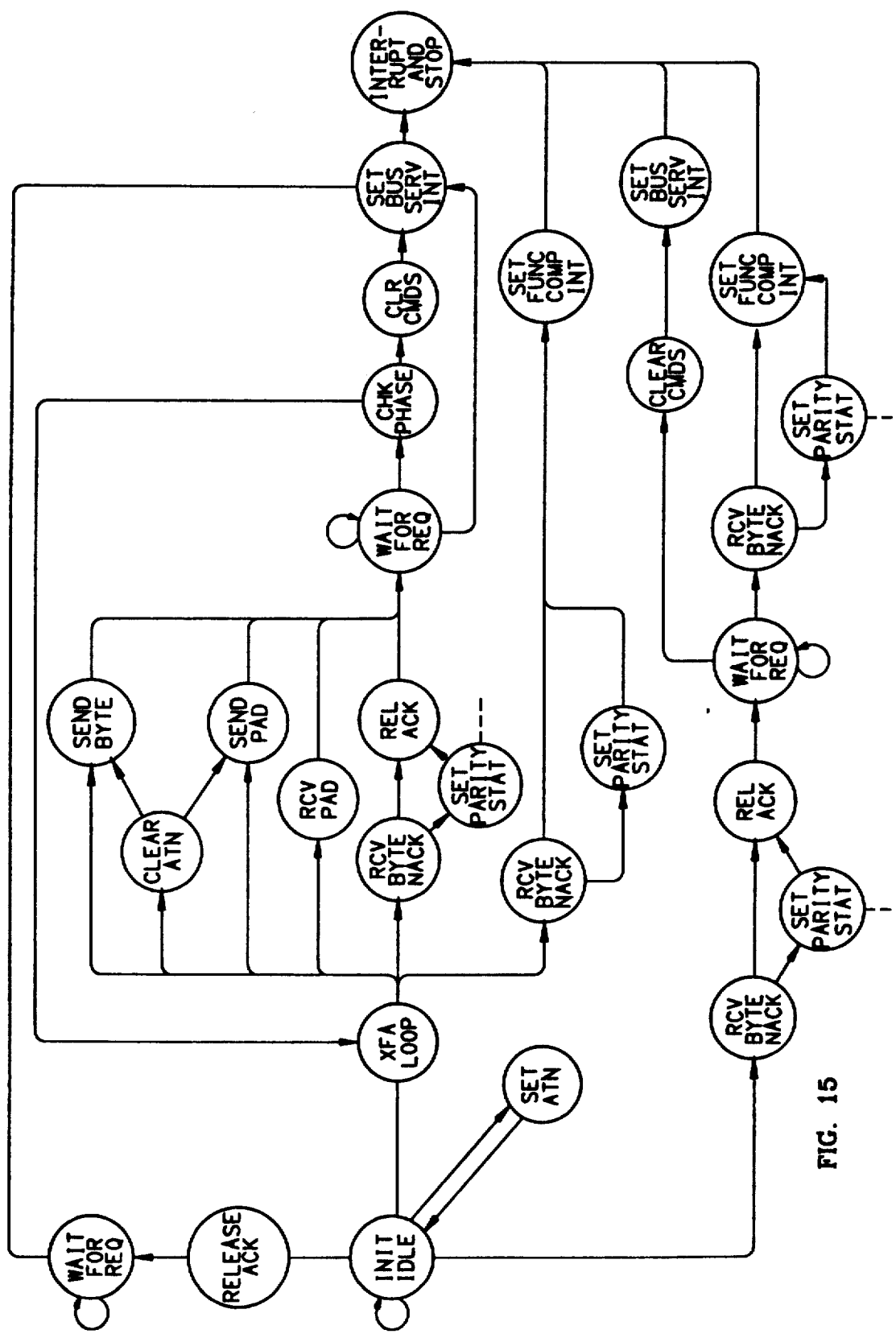

FIG. 8 shows command sequences; FIGS. 9, 10 and 11 show disconnected state commands; FIG. 12 shows the bus arbitration operation; FIG. 13 shows the bus selection and reselection operations; FIG. 14 shows Target mode commands; and FIG. 15 shows Initiator mode commands.

What is claimed is:

1. Bus interface circuitry for transmitting and receiving a sequence of data signals through a communication bus, the bus having a plurality of control lines and a plurality of data lines, including:
   (1) a first bus interface means for coupling to the bus and for transmitting each of the data signals on the data lines, and further including:
      (a) synchronization means for synchronizing the internal operation of the first bus interface means to the time of initial transmission of each of the data signals;
      (b) a first control signal transmitter for transmitting a first control signal (b, b') and a third control signal (d, d') on the control lines;
      (c) a first control signal receiver for receiving a second control signal (c, c') and a fourth control signal (f, f') from the control lines;
   (2) a second bus interface means for coupling to the bus and for receiving each data signal from the data lines, and further including:
      (a) a second control signal receiver for receiving the first control signal (b, b') and the third control signal (d, d') from the control lines;
      (b) a second control signal transmitter for transmitting the second control signal (c, c') and the fourth control signal (f, f') on the control lines;
   (3) wherein the sequence of data signals is transmitted from the first bus interface means to the second bus interface means in a control signal handshake cycle in which:
      (a) a data signal is transmitted by the first bus interface means as a transmitted data signal at a first time point (a, a');
      (b) the first control signal (b, b') is transmitted a selected amount of time after the synchronization means determines the time of initial transmission of the transmitted data signal, the first control signal (b, b') indicating transmission of the transmitted data signal on the data lines;
      (c) in response to, and asynchronously with respect to, reception of the first control signal (b, b'), the second control signal (c, c') is transmitted, and, concurrently, the transmitted data signal is received by the second bus interface means, the second control signal (c, c') indicating receipt of the transmitted data signal from the data lines;
      (d) in response to, and asynchronously with respect to, reception of the second control signal (c, c'), the third control signal (d, d') is transmitted;
      (e) directly in response to, and asynchronously with respect to, reception of the second control signal (c, c'), a next data signal is transmitted by the first bus interface means as a next transmitted data signal at a next time point (e, e');
      (f) in response to, and asynchronously with respect to, reception of the third control signal (d, d'), the fourth control signal (f, f') is transmitted after the next time point (e);
      (g) the handshake cycle of elements 3(b) through 3(f) is repeated for each such next transmitted data signal, such cycle minimizing the time between transmission of each of such data signals.

2. The bus interface circuitry of claim 1, wherein at least one of the first bus interface means and second bus interface means comprises a single integrated circuit chip.

3. The bus interface circuitry of claim 1, wherein:
   (1) transmitted data signals comprising a group of data bits is encoded with parity on said data lines; and
   (2) the second bus interface means further includes parity check circuitry for:
      (a) detecting the parity of each received transmitted group of data bits;
      (b) transmitting a parity error attention signal on the control lines when the parity check circuitry detects a parity error.

4. The bus interface circuitry of claim 3, wherein:
   (1) the parity check circuitry requires a parity check time period to detect parity errors and transmit the parity error attention signal on the control lines if a parity error is detected; and
   (2) the control signal transmitter for transmitting the fourth control signal (f) further comprises a time delay means to delay, for a predetermined time delay period at least as long as the parity check time period, transmission of the fourth control signal (f).

5. Bus interface circuitry for transmitting a sequence of data signals through a communication bus, the bus having a plurality of control lines and a plurality of data lines, to a receiving interface means for coupling to the bus and for receiving each data signal from the data lines, the receiving interface means further including (a)

a receiving interface means control signal receiver for receiving a first control signal (b, b') and a third control signal (d, d') from the control lines, and (b) a receiving interface means control signal transmitter for transmitting a second control signal (c, c') and a fourth control signal (f, f') on the control lines, the bus interface circuitry including:

(1) a bus interface means for coupling to the bus and for transmitting each of the data signals on the data lines, and further including:
  (a) synchronization means for synchronizing the internal operation of the bus interface means to the time of initial transmission of each of the data signals;
  (b) a control signal transmitter for transmitting the first control signal (b, b') and the third control signal (d, d') on the control lines;
  (c) a control signal receiver for receiving the second control signal (c, c') and the fourth control signal (f, f') from the control lines;
(2) wherein the sequence of data signals is transmitted from the bus interface means to the receiving interface means in a control signal handshake cycle in which:
  (a) a data signal is transmitted by the bus interface means as a transmitted data signal at a first time point (a, a');
  (b) the first control signal (b, b') is transmitted a selected amount of time after the synchronization means determines the time of initial transmission of the transmitted data signal, the first control signal (b, b') indicating transmission of the transmitted data signal on the data lines;
  (c) in response to, and asynchronously with respect to, reception of the first control signal (b, b'), the second control signal (c, c') is transmitted, and, concurrently, the transmitted data signal is received by the receiving interface means, the second control signal (c, c') indicating receipt of the transmitted data signal from the data lines;
  (d) in response to, and asynchronously with respect to, reception of the second control signal (c, c'), the third control signal (d, d') is transmitted;
  (e) directly in response to, and asynchronously with respect to, reception of the second control signal (c, c'), a next data signal is transmitted by the bus interface means as a next transmitted data signal at a next time point (e, e');
  (f) in response to, and asynchronously with respect to, reception of the third control signal (d, d'), the fourth control signal (f, f') is transmitted after the next time point (e);
  (g) the handshake cycle of elements 2(b) through 2(f) is repeated for each such next transmitted data signal, such cycle minimizing the time between transmission of each of such data signals.

6. Bus interface circuitry for receiving a sequence of data signals through a communication bus, the bus having a plurality of control lines and a plurality of data lines, from a transmitting interface means for coupling to the bus and for transmitting each of the data signals on the data lines, the transmitting interface means further including: (a) synchronization means for synchronizing the internal operation of the transmitting interface means to the time of initial transmission of each of the data signals, (b) a transmitting interface means control signal transmitter for transmitting a first control signal (b, b') and a third control signal (d, d') on the control lines, and (c) a transmitting interface means control signal receiver for receiving a second control signal (c, c') and a fourth control signal (f, f') from the control lines, the bus interface circuitry including:

(1) a bus interface means for coupling to the bus and for receiving each data signal from the data lines, and further including:
  (a) a control signal receiver for receiving the first control signal (b, b') and the third control signal (d, d') from the control lines;
  (b) a control signal transmitter for transmitting the second control signal (c, c') and the fourth control signal (f, f') on the control lines;
(2) wherein the sequence of data signals is transmitted from the transmitting interface means to the bus interface means in a control signal handshake cycle in which:
  (a) a data signal is transmitted by the transmitting bus interface means as a transmitted data signal at a first time point (a, a');
  (b) the first control signal (b, b') is transmitted a selected amount of time after the synchronization means determines the time of initial transmission of the transmitted data signal, the first control signal (b, b') indicating transmission of the transmitted data signal on the data lines;
  (c) in response to, and asynchronously with respect to, reception of the first control signal (b, b'), the second control signal (c, c') is transmitted, and, concurrently, the transmitted data signal is received by the bus interface means, the second control signal (c, c') indicating receipt of the transmitted data signal from the data lines;
  (d) in response to, and asynchronously with respect to, reception of the second control signal (c, c'), the third control signal (d, d') is transmitted;
  (e) directly in response to, and asynchronously with respect to, reception of the second control signal (c, c'), a next data signal is transmitted by the transmitting bus interface means as a next transmitted data signal at a next time point (e,e');
  (f) in response to, and asynchronously with respect to, reception of the third control signal (d, d'), the fourth control signal (f, f') is transmitted after the next time point ('e);
  (g) the handshake cycle of elements 2(b) through 2(f) is repeated for each such next transmitted data signal, such cycle minimizing the time between transmission of each of such data signals.

7. The bus interface circuitry of claim 6, wherein:
(1) transmitted data signals comprising a group of data bits is encoded with parity on said data lines; and
(2) the bus interface means further includes parity check circuitry for:
  (a) detecting the parity of each received transmitted group of data bits;
  (b) transmitting a parity error attention signal on the control lines when the parity check circuitry detects a parity error.

8. The bus interface circuitry of claim 7, wherein:
(1) the parity check circuitry requires a parity check time period to detect parity errors and transmit the parity error attention signal on the control lines if a parity error is detected; and
(2) the control signal transmitter for transmitting the fourth control signal (f) further comprises a time delay means to delay, for a predetermined time delay period at least as long as the parity check time period, transmission of the fourth control signal (f).

9. The bus interface circuitry of claims 5 or 6, wherein the bus interface means comprises a single integrated circuit chip.

10. Bus interface circuitry for transmitting and receiving a sequence of data signals through a communication bus, the bus having a plurality of control lines and a plurality of data lines, including:
(1) a first bus interface for coupling to the bus and including:
  (a) a data transmitter for transmitting each of the data signals on the data lines;
  (b) a first control signal transmitter for transmitting a first control signal (b, b') and a third control signal (d, d') on the control lines;
  (c) a first control signal receiver for receiving a second control signal (c, c') and a fourth control signal (f, f') from the control lines;
  (d) synchronization circuitry for determining a single first bus interface synchronization time point in response to transmission of each data signal;
(2) a second bus interface for coupling to the bus and including:
  (a) a data receiver for receiving each data signal from the data lines;
  (b) a second control signal receiver for receiving the first control signal (b, b') and the third control signal (d, d') from the control lines;
  (c) a second control signal transmitter for transmitting the second control signal (c, c') and the fourth control signal (f, f') on the control lines;
(3) wherein the sequence of data signals is transmitted from the first bus interface to the second bus interface in a control signal handshake cycle in which:
  (a) a data signal is transmitted by the data transmitter as a transmitted data signal at a first time point (a, a');
  (b) the first control signal (b, b') is transmitted a selected amount of time after the synchronization circuitry determines the single first bus interface synchronization time point from the transmitted data signal, the first control signal (b, b') indicating transmission of the transmitted data signal on the data lines;
  (c) in response to, and asynchronously with respect to, reception of the first control signal (b, b'), the second control signal (c, c') is transmitted, and, concurrently, the transmitted data signal is received by the data receiver, the second control signal (c, c') indicating receipt of the transmitted data signal from the data lines;
  (d) in response to, and asynchronously with respect to, reception of the second control signal (c, c'), the third control signal (d, d') is transmitted;
  (e) directly in response to, and asynchronously with respect to, reception of the second control signal (c, c'), a next data signal is transmitted by the data transmitter as a next transmitted data signal at a next time point (e, e');
  (f) in response to, and asynchronously with respect to, reception of the third control signal (d, d'), the fourth control signal (f, f') is transmitted after the next time point (e);
  (g) the handshake cycle of elements 3(b) through 3(f) is repeated for each such next transmitted data signal, such cycle minimizing the time between transmission of each of such data signals.

11. Bus interface circuitry for transmitting a sequence of data signals through a communication bus to a receiving interface circuit coupled to the bus, the bus having a plurality of control lines and a plurality of data lines, the receiving interface circuit for coupling to the bus and including (a) a data receiver for receiving each data signal from the data lines, (b) a receiving interface circuit control signal receiver for receiving a first control signal (b, b') and a third control signal (d, d') from the control lines, and (c) a receiving interface circuit control signal transmitter for transmitting a second control signal (c, c') and a fourth control signal (f, f') on the control lines, the bus interface circuitry including:
(1) a data transmitter for coupling to the bus and for transmitting each of the data signals on the data lines;
(2) a control signal transmitter for transmitting the first control signal (b, b') and the third control signal (d, d') on the control lines;
(3) a control signal receiver for receiving the second control signal (c, c') and the fourth control signal (f, f') from the control lines;
(4) synchronization circuitry for determining a single bus interface circuitry synchronization time point in response to transmission of each data signal;
(5) wherein the sequence of data signals is transmitted from the bus interface circuitry to the receiving interface circuit in a control signal handshake cycle in which:
  (a) a data signal is transmitted by the data transmitter as a transmitted data signal at a first time point (a, a');
  (b) the first control signal (b, b') is transmitted a selected amount of time after the synchronization circuitry determines the single bus interface circuitry synchronization time point from the transmitted data signal, the first control signal (b, b') indicating transmission of the transmitted data signal on the data lines;
  (c) in response to, and asynchronously with respect to, reception of the first control signal (b, b'), the second control signal (c, c') is transmitted, and, concurrently, the transmitted data signal is received by the data receiver, the second control signal (c, c') indicating receipt of the transmitted data signal from the data lines;
  (d) in response to, and asynchronously with respect to, reception of the second control signal (c, c'), the third control signal (d, d') is transmitted;
  (e) directly in response to, and asynchronously with respect to, reception of the second control signal (c, c'), a next data signal is transmitted by the data transmitter as a next transmitted data signal at a next time point (e, e');
  (f) in response to, and asynchronously with respect to, reception of the third control signal (d, d'), the fourth control signal (f, f') is transmitted after the next time point (e)
  (g) the handshake cycle of elements 5(b) through 5(f) is repeated for each such next transmitted data signal, such cycle minimizing the time between transmission of each of such data signals.

12. Bus interface circuitry for receiving a sequence of data signals through a communication bus from a transmitting interface circuit coupled to the bus, the bus having a plurality of control lines and a plurality of data lines, the transmitting interface circuit for coupling to the bus and including (a) a data transmitter for transmitting each of the data signals on the data lines, (b) a transmitting interface circuit control signal transmitter for transmitting a first control signal (b, b') and a third control signal (d, d') on the control lines, (c) a transmitting interface circuit control signal receiver for receiving a second control signal (c, c') and a fourth control signal (f, f') from the control lines, and (d) synchronization circuitry for determining a single transmitting interface circuit synchronization time point in response to transmission of each data signal, the bus interface circuitry including:

(1) a data receiver for coupling to the bus and for receiving each data signal from the data lines;

(2) a control signal receiver for receiving the first control signal (b, b') and the third control signal (d, d') from the control lines;

(3) a control signal transmitter for transmitting the second control signal (c, c') and the fourth control signal (f, f') on the control lines;

(4) wherein the sequence of data signals is transmitted from the transmitting interface circuit to the bus interface circuitry in a control signal handshake cycle in which:

(a) a data signal is transmitted by the data transmitter as a transmitted data signal at a first time point (a, a');

(b) the first control signal (b, b') is transmitted a selected amount of time after the synchronization circuitry determines the single transmitting interface circuit synchronization time point from the transmitted data signal, the first control signal (b, b') indicating transmission of the transmitted data signal on the data lines;

(c) in response to, and asynchronously with respect to, reception of the first control signal (b, b'), the second control signal (c, c') is transmitted, and, concurrently, the transmitted data signal is received by the data receiver, the second control signal (c, c') indicating receipt of the transmitted data signal from the data lines;

(d) in response to, and asynchronously with respect to, reception of the second control signal (c, c'), the third control signal (d, d') is transmitted;

(e) directly in response to, and asynchronously with respect to, reception of the second control signal (c, c'), a next data signal is transmitted by the data transmitter as a next transmitted data signal at a next time point (e, e');

(f) in response to, and asynchronously with respect to, reception of the third control signal (d, d'), the fourth control signal (f, f') is transmitted after the next time point (e);

(g) the handshake cycle of elements 4(b) through 4(f) is repeated for each such next transmitted data signal, such cycle minimizing the time between transmission of each of such data signals.

13. Bus interface circuitry for coupling a first input/output device to a second input/output device through a communication bus, the bus having a plurality of control lines and a plurality of data lines, including:

(1) first bus interface circuitry for coupling to the bus and including:

(a) a first input/output device interface for coupling to the first input/output device, and for receiving an outgoing sequence of data bytes from the first input/output device;

(b) a data transmitter for transmitting each of the outgoing data bytes as a corresponding first bus interface data signal on the data lines;

(c) a first bus interface control signal transmitter for transmitting a first bus interface control signal (b, b') and a third bus interface control signal (d, d') on the control lines;

(d) a first bus interface control signal receiver for receiving a second bus interface control signal (c, c') and a fourth bus interface control signal (f, f') from the control lines;

(e) synchronization circuitry for determining a single first bus interface circuitry synchronization time point in response to transmission of each first bus interface data signal;

(2) second bus interface circuitry for coupling to the bus and including:

(a) a data receiver for receiving each first bus interface data signal from the data lines as a corresponding incoming data byte;

(b) a second input/output device interface for coupling to the second input/output device, and for transmitting each incoming data byte to the second input/output device;

(c) a second bus interface control signal receiver for receiving the first bus interface control signal (b, b') and the third bus interface control signal (d, d') from the control lines;

(d) a second bus interface control signal transmitter for transmitting the second bus interface control signal (c, c') and the fourth bus interface control signal (f, f') on the control lines;

(3) wherein the sequence of outgoing data bytes is transmitted from the first bus interface circuitry to the second bus interface circuitry in a control signal handshake cycle in which:

(a) a first bus interface data signal corresponding to one of the outgoing data bytes is transmitted by the data transmitter as a transmitted data signal at a first time point (a, a');

(b) the first bus interface control signal (b, b') is transmitted a selected amount of time after the synchronization circuitry determines the single first bus interface circuitry synchronization time point from the transmitted data signal, the first bus interface control signal (b, b') indicating transmission of the transmitted data signal on the data lines;

(c) in response to, and asynchronously with respect to, reception of the first bus interface control signal (b, b'), the second bus interface control signal (c, c') is transmitted, and, concurrently, the transmitted data signal is received by the data receiver as an incoming data byte, the second bus interface control signal (c, c') indicating receipt of the transmitted data signal from the data lines;

(d) in response to, and asynchronously with respect to, reception of the second bus interface control signal (c, c'), the third bus interface control signal (d, d') is transmitted;

(e) directly in response to, and asynchronously with respect to, reception of the second bus interface control signal (c, c'), a next first bus interface data signal corresponding to a next one of the outgoing data bytes is transmitted by the data transmitter as a next transmitted data signal at a next time point (e, e');

(f) in response to, and asynchronously with respect to, reception of the third bus interface control signal (d, d'), the fourth bus interface control signal (f, f') is transmitted after the next time point (e);

(g) the handshake cycle of elements 3(b) through 3(f) is repeated for each such next transmitted data signal, such cycle minimizing the time between transmission of each of such outgoing data bytes.

14. The bus interface circuitry of claim 13, wherein at least one of the first bus interface circuitry and second bus interface circuitry comprises a single integrated circuit chip.

15. Bus interface circuitry for coupling an outgoing sequence of data bytes from a first input/output device as first bus interface data signals through a communication bus, the bus having a plurality of control lines and a plurality of data lines, to a second input/output device, the second input/output device including second bus interface circuitry for coupling to the bus and including (a) a data receiver for receiving each first bus interface data signal from the data lines as a corresponding incoming data byte, (b) a second bus interface control signal receiver for receiving a first bus interface control signal (b, b') and a third bus interface control signal (d, d') from the control lines, and (c) a second bus interface control signal transmitter for transmitting a second bus interface control signal (c, c') and a fourth bus interface control signal (f, f') on the control lines, the bus interface circuitry including:

(1) first bus interface circuitry for coupling to the bus;

(2) an input/output device interface for coupling to the first input/output device, and for receiving the outgoing sequence of data bytes from the first input/output device;

(3) a data transmitter for transmitting each of the outgoing data bytes as a corresponding first bus interface data signal on the data lines;

(4) a first bus interface control signal transmitter for transmitting the first bus interface control signal (b, b') and the third bus interface control signal (d, d') on the control lines;

(5) a first bus interface control signal receiver for receiving the second bus interface control signal (c, c') and the fourth bus interface control signal (f, f') from the control lines;

(6) synchronization circuitry for determining a single first bus interface circuitry synchronization time point in response to transmission of each first bus interface data signal;

(7) wherein the sequence of outgoing data bytes is transmitted from the first input/output device to the second input/output device in a control signal handshake cycle in which:

(a) a first bus interface data signal corresponding to one of the outgoing data bytes is transmitted by the data transmitter as a transmitted data signal at a first time point (a, a');

(b) the first bus interface control signal (b, b') is transmitted a selected amount of time after the synchronization circuitry determines the single first bus interface circuitry synchronization time point from the transmitted data signal, the first bus interface control signal (b, b') indicating transmission of the transmitted data signal on the data lines;

(c) in response to, and asynchronously with respect to, reception of the first bus interface control signal (b, b'), the second bus interface control signal (c, c') is transmitted, and, concurrently, the transmitted data signal is received by the data receiver as an incoming data byte, the second bus interface control signal (c, c') indicating receipt of the transmitted data signal from the data lines;

(d) in response to, and asynchronously with respect to, reception of the second bus interface control signal (c, c'), the third bus interface control signal (d, d') is transmitted;

(e) directly in response to, and asynchronously with respect to, reception of the second bus interface control signal (c, c'), a next first bus interface data signal corresponding to a next one of the outgoing data bytes is transmitted by the data transmitter as a next transmitted data signal at a next time point (e, e');

(f) in response to, and asynchronously with respect to, reception of the third bus interface control signal (d, d'), the fourth bus interface control signal (f, f') is transmitted after the next time point (e);

(g) the handshake cycle of elements 7(b) through 7(f) is repeated for each such next transmitted data signal, such cycle minimizing the time between transmission of each of such outgoing data bytes.

16. Bus interface circuitry for coupling an outgoing sequence of data bytes from a first input/output device as first bus interface data signals through a communication bus, the bus having a plurality of control lines and a plurality of data lines, to a second input/output device, the first input/output device including first bus interface circuitry for coupling to the bus and including (a) a data transmitter for transmitting each of the outgoing data bytes as a corresponding first bus interface data signal on the data lines, (b) a first bus interface control signal transmitter for transmitting a first bus interface control signal (b, b') and a third bus interface control signal (d, d') on the control lines, (c) a first bus interface control signal receiver for receiving a second bus interface control signal (c, c') and a fourth bus interface control signal (f, f') from the control lines, and (d) synchronization circuitry for determining a single first bus interface circuitry synchronization time point in response to transmission of each first bus interface data signal, the bus interface circuitry including:

(1) second bus interface circuitry for coupling to the bus;

(2) a data receiver for receiving each first bus interface data signal from the data lines as a corresponding incoming data byte;

(3) a second input/output device interface for coupling to the second input/output device, and for transmitting each incoming data byte to the second input/output device;

(4) a second bus interface control signal receiver for receiving the first bus interface control signal (b, b') and the third bus interface control signal (d, d') from the control lines;

(5) a second bus interface control signal transmitter for transmitting the second bus interface control signal (c, c') and the fourth bus interface control signal (f, f') on the control lines;

(6) wherein the sequence of outgoing data bytes is transmitted from the first input/output device to the second input/output device in a control signal handshake cycle in which:
  (a) a first bus interface data signal corresponding to one of the outgoing data bytes is transmitted by the data transmitter as a transmitted data signal at a first time point (a, a');
  (b) the first bus interface control signal (b, b') is transmitted a selected amount of time after the synchronization circuitry determines the single first bus interface circuitry synchronization time point from the transmitted data signal, the first bus interface control signal (b, b') indicating transmission of the transmitted data signal on the data lines;
  (c) in response to, and asynchronously with respect to, reception of the first bus interface control signal (b, b'), the second bus interface control signal (c, c') is transmitted, and, concurrently, the transmitted data signal is received by the data receiver as an incoming data byte, the second bus interface control signal (c, c') indicating receipt of the transmitted data signal from the data lines;
  (d) in response to, and asynchronously with respect to, reception of the second bus interface control signal (c, c'), the third bus interface control signal (d, d') is transmitted;
  (e) directly in response to, and asynchronously with respect to, reception of the second bus interface control signal (c, c'), a next first bus interface data signal corresponding to a next one of the outgoing data bytes is transmitted by the data transmitter as a next transmitted data signal at a next time point (e, e');
  (f) in response to, and asynchronously with respect to, reception of the third bus interface control signal (d, d'), the fourth bus interface control signal (f, f') is transmitted after the next time point (e);
  (g) the handshake cycle of elements 6(b) through 6(f) is repeated for each such next transmitted data signal, such cycle minimizing the time between transmission of each of such outgoing data bytes.

17. Bus interface circuitry for transmitting and receiving a sequence of data signals through a small computer system interface (SCSI) bus, the SCSI bus having a plurality of control lines and a plurality of data lines, including:
  (1) a first bus interface for coupling to the SCSI bus and including:
    (a) a data transmitter for transmitting each of the data signals on the data lines;
    (b) a first control signal transmitter for asserting a Request signal and de-asserting the Request signal on the control lines;
    (c) a first control signal receiver for receiving an asserted Acknowledgement signal and a de-asserted Acknowledgement signal from the control lines;
    (d) synchronization circuitry for determining a single first bus interface synchronization time point in response to transmission of each data signal;
  (2) a second bus interface for coupling to the SCSI bus and including:
    (a) a data receiver for receiving each data signal from the data lines;
    (b) a second control signal receiver for receiving the asserted Request signal and the de-asserted Request signal from the control lines;
    (c) a second control signal transmitter for asserting an Acknowledgement signal and de-asserting the Acknowledgement signal on the control lines;
  (3) wherein the sequence of data signals is transmitted from the first bus interface to the second bus interface in a control signal handshake cycle in which:
    (a) a data signal is transmitted by the data transmitter as a transmitted data signal at a first time point (a);
    (b) the Request signal is asserted a selected amount of time after the synchronization circuitry determines the single first bus interface synchronization time point from the transmitted data signal, the asserted Request signal indicating transmission of the transmitted data signal on the data lines;
    (c) in response to, and asynchronously with respect to, reception of the asserted Request signal, the Acknowledgement signal is asserted, and, concurrently, the transmitted data signal is received by the data receiver, the asserted Acknowledgement signal indicating receipt of the transmitted data signal from the data lines;
    (d) in response to, and asynchronously with respect to, reception of the asserted Acknowledgement signal, the Request signal is de-asserted;
    (e) directly in response to, and asynchronously with respect to, reception of the asserted Acknowledgement signal, a next data signal is transmitted by the data transmitter as a next transmitted data signal at a next time point (e);
    (f) in response to, and asynchronously with respect to, reception of the de-asserted Request signal the Acknowledgement signal is de-asserted after the next time point (e);
    (g) the handshake cycle of elements 3(b) through 3(f) is repeated for each such next transmitted data signal, such cycle minimizing the time between transmission of each of such data signals.

18. The bus interface circuitry of claim 17, wherein the first bus interface comprises a SCSI bus Target.

19. The bus interface circuitry of claim 17, wherein the second bus interface comprises a SCSI bus Initiator.

20. The bus interface circuitry of claim 17, wherein the selected amount of time is approximately the least amount of time required by the SCSI bus for assertion of the Request signal.

21. The bus interface circuitry of claim 17, wherein:
  (1) transmitted data signals comprising a group of data bits is encoded with parity on said data lines; and
  (2) the data receiver further includes parity check circuitry for:
    (a) detecting the parity of each received transmitted group of data bits;
    (b) transmitting a parity error attention signal on the control lines when the parity check circuitry detects a parity error.

22. The bus interface circuitry of claim 21, wherein:
  (1) the parity check circuitry requires a parity check time period to detect parity errors and transmit the parity error attention signal on the control lines if a parity error is detected; and
  (2) the second control signal transmitter further comprises a time delay means to delay, for a predetermined time delay period at least as long as the parity check time period, de-assertion of the Acknowledgement signal.

23. Bus interface circuitry for transmitting and receiving a sequence of data signals through a small computer system interface (SCSI) bus, the SCSI bus having a plurality of control lines and a plurality of data lines, including:
(1) a first bus interface for coupling to the SCSI bus and including:
 (a) a data transmitter for transmitting each of the data signals on the data lines;
 (b) a first control signal transmitter for asserting an Acknowledgement signal and de-asserting the Acknowledgement signal on the control lines;
 (c) a first control signal receiver for receiving an asserted Request signal and a de-asserted Request signal from the control lines;
 (d) synchronization circuitry for determining a single first bus interface synchronization time point in response to transmission of each data signal;
(2) a second bus interface for coupling to the SCSI bus and including:
 (a) a data receiver for receiving each data signal from the data lines;
 (b) a second control signal receiver for receiving the asserted Acknowledgement signal and the de-asserted Acknowledgement signal from the control lines;
 (c) a second control signal transmitter for asserting a Request signal and de-asserting the Request signal on the control lines;
(3) wherein the sequence of data signals is transmitted from the first bus interface to the second bus interface in a control signal handshake cycle in which:
 (a) a data signal is transmitted by the data transmitter as a transmitted data signal at a first time point (a');
 (b) the Acknowledgement signal is asserted a selected amount of time after the synchronization circuitry determines the single first bus interface synchronization time point from the transmitted data signal, the asserted Acknowledgement signal indicating transmission of the transmitted data signal on the data lines;
 (c) in response to, and asynchronously with respect to, reception of the asserted Acknowledgement signal, the Request signal is asserted, and, concurrently, the transmitted data signal is received by the data receiver, the asserted Request signal indicating receipt of the transmitted data signal from the data lines;
 (d) in response to, and asynchronously with respect to, reception of the asserted Request signal, the Acknowledgement signal is de-asserted;
 (e) directly in response to, and asynchronously with respect to, reception of the asserted Request signal, a next data signal is transmitted by the data transmitter as a next transmitted data signal at a next time point (e');
 (f) in response to, and asynchronously with respect to, reception of the de-asserted Acknowledgement signal, the Request signal is de-asserted;
 (g) the handshake cycle of elements 3(b) through 3(f) is repeated for each such next transmitted data signal, such cycle minimizing the time between transmission of each of such data signals.

24. The bus interface circuitry of claim 23, wherein the first bus interface comprises a SCSI bus Initiator.

25. The bus interface circuitry of claim 23, wherein the second bus interface comprises a SCSI bus Target.

26. The bus interface circuitry of claim 23, wherein the selected amount of time is approximately the least amount of time required by the SCSI bus for assertion of the Acknowledgement signal.

27. The bus interface circuitry of claims 1, 5, 6, 10, 11, 12, 13, 15, 16, or 17, wherein the control signal handshake cycle comprises a SCSI bus DATA-IN mode of operation.

28. The bus interface circuitry of claims 1, 5, 6, 10, 11, 12, 13, 15, 16, or 23, wherein the control signal handshake cycle comprises a SCSI bus DATA-OUT mode of operation.

29. The bus interface circuitry of claims 1, 5, 6, 10, 11, or 12, wherein the communication bus comprises a small computer system interface (SCSI) bus.

30. The bus interface circuitry of claim 29, wherein the selected amount of time is approximately the least amount of time required by the SCSI bus for transmitting the first control signal (b, b').

31. The bus interface circuitry of claims 13, 15, or 16, wherein the communication bus comprises a small computer system interface (SCSI) bus.

32. The bus interface circuitry of claim 31, wherein the selected amount of time is approximately the least amount of time required by the SCSI bus for transmitting the first bus interface control signal (b, b').

33. The bus interface circuitry of claims 10, 17, or 23, wherein at least one of the first bus interface and second bus interface comprises a single integrated circuit chip.

34. The bus interface circuitry of claims 11, 12, 15, or 16, wherein the bus interface circuitry comprises a single integrated circuit chip.

35. The bus interface circuitry of claims 10, 12, 13, or 16, wherein:
(1) transmitted data signals comprising a group of data bits is encoded with parity on said data lines; and
(2) the data receiver further includes parity check circuitry for:
 (a) detecting the parity of each received transmitted group of data bits;
 (b) transmitting a parity error attention signal on the control lines when the parity check circuitry detects a parity error.

36. The bus interface circuitry of claim 35, wherein:
(1) the parity check circuitry requires a parity check time period to detect parity errors and transmit the parity error attention signal on the control lines if a parity error is detected; and
(2) the control signal transmitter for transmitting the fourth control signal (f) further comprises a time delay means to delay, for a predetermined time delay period at least as long as the parity check time period, transmission of the fourth control signal (f).

* * * * *

UNITED STATES PATENT AND TRADEMARK OFFICE
CERTIFICATE OF CORRECTION

PATENT NO. : 5,276,807
DATED : January 4, 1994
INVENTOR(S) : Jean Kodama, Borden T. Moller and Paul R. Nitza It is certified that error appears in the above-indentified patent and that said Letters Patent is hereby corrected as shown below:

On the cover page, ITEM: 54, the Title, after "DATA", change "TRANSMISSION" to --TRANSMISSIONS--; and after "HANDSHAKING", add --PROTOCOL--.

On the cover page, Item: 73, the Assignee, change "Emulex Corporation" to --QLogic Corporation--.

At column 4, line 1, after "step", insert --counter--.

At column 4, line 67, after "counter", insert --register--.

At column 5, line 39, after "for", delete "a" and insert therefor --an--.

At column 5, line 53, after "Initiator", insert --processor--, and after "Target", insert --processor--.

At column 5, line 55, after "Initiator", insert --processor--.

At column 5, line 56, after "Target", insert --processor--.

At column 8, claim 1, line 32, after "point", delete "(e)", and insert therefor --(e,e')--.

At column 8, claim 1, line 35, after "cycle", delete "minimizing", and insert therefor --thereby reducing--.

At column 9, claim 5, line 52, after "point", delete "(e)", and insert therefor --(e,e')--.

At column 9, claim 5, line 55, after "cycle", delete "minimizing", and insert therefor --thereby reducing--.

UNITED STATES PATENT AND TRADEMARK OFFICE
CERTIFICATE OF CORRECTION

PATENT NO. : 5,276,807
DATED : January 4, 1994
INVENTOR(S) : Jean Kodama, Borden T. Moller and Paul R. Nitza It is certified that error appears in the above-indentified patent and that said Letters Patent is hereby corrected as shown below:

At column 10, claim 6, line 45, after "point", delete "('e)", and insert therefor --(e,e')--.

At column 10, claim 6, line 48, after "cycle", delete "minimizing", and insert therefor --thereby reducing--.

At column 11, claim 10, line 66, after "point", delete "(e)", and insert therefor --(e,e')--.

At column 12, claim 10, line 1, after "cycle", delete "minimizing", and insert therefor --thereby reducing--.

At column 12, claim 11, line 60, after "point", delete "(e)", and insert therefor --(e,e')--.

At column 12, claim 11, line 63, after "cycle", delete "minimizing", and insert therefor --thereby reducing--.

At column 13, claim 12, line 54, after "point", delete "(e)", and insert therefor --(e,e')--.

At column 13, claim 12, line 57, after "cycle", delete "minimizing", and insert therefor --thereby reducing--.

At column 15, claim 13, line 5, after "point", delete "(e)", and insert therefor --(e,e')--.

At column 15, claim 13, line 8, after "cycle", delete "minimizing", and insert therefor --thereby reducing--.

At column 16, claim 15, line 24, after "point", delete "(e)", and insert therefor --(e,e')--.

UNITED STATES PATENT AND TRADEMARK OFFICE
CERTIFICATE OF CORRECTION

PATENT NO. : 5,276,807
DATED : January 4, 1994
INVENTOR(S) : Jean Kodama, Borden T. Moller and Paul R. Nitza It is certified that error appears in the above-indentified patent and that said Letters Patent is hereby corrected as shown below:

At column 16, claim 15, line 27, after "cycle", delete "minimizing", and insert therefor --thereby reducing--.

At column 17, claim 16, line 39, after "point", delete "(e)", and insert therefor --(e,e')--.

At column 17, claim 16, line 42, after "cycle", delete "minimizing", and insert therefor --thereby reducing--.

At column 18, claim 17, line 41, after "cycle", delete "minimizing", and insert therefor --thereby reducing--.

At column 19, claim 23, line 49, after "is", delete "asserted", and insert therefor --de-asserted--.

At column 19, claim 23, line 51, after "the" and before "Request", delete "asserted", and insert therefor --de-asserted--.

At column 19, claim 23, line 55, after "the" and before "Request", delete "asserted", and insert therefor --de-asserted--.

UNITED STATES PATENT AND TRADEMARK OFFICE
CERTIFICATE OF CORRECTION

PATENT NO. : 5,276,807
DATED : January 4, 1994
INVENTOR(S) : Jean Kodama, Borden T. Moller and Paul R. Nitza It is certified that error appears in the above-indentified patent and that said Letters Patent is hereby corrected as shown below:

At column 19, claim 23, line 58, after "the", delete "asserted", and insert therefor --de-asserted--.

At column 19, claim 23, line 64, after "is", delete "de-asserted", and insert therefor --asserted after the next time point (e,)--.

Signed and Sealed this

Sixteenth Day of May, 1995

Attest:

BRUCE LEHMAN

Attesting Officer

Commissioner of Patents and Trademarks